United States Patent
Kang et al.

(10) Patent No.: US 12,554,773 B2
(45) Date of Patent: Feb. 17, 2026

(54) METHODS AND SYSTEM FOR IMPORTING DATA TO A GRAPH DATABASE USING NEAR-STORAGE PROCESSING

(71) Applicant: Samsung Electronics Co., Ltd., Gyeonggi-do (KR)

(72) Inventors: Seongyoung Kang, Irvine, CA (US); Mohammadreza Soltaniyeh, Sunnyvale, CA (US); Xuebin Yao, Mountain View, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/456,955

(22) Filed: Aug. 28, 2023

(65) Prior Publication Data
US 2024/0070199 A1  Feb. 29, 2024

Related U.S. Application Data

(60) Provisional application No. 63/445,687, filed on Feb. 14, 2023, provisional application No. 63/402,446, filed on Aug. 30, 2022.

(51) Int. Cl.
*G06F 16/901* (2019.01)
(52) U.S. Cl.
CPC .................. *G06F 16/9024* (2019.01)
(58) Field of Classification Search
CPC ................................ G06F 16/9024
See application file for complete search history.

(56) References Cited

U.S. PATENT DOCUMENTS

| | | | |
|---|---|---|---|
| 10,120,956 B2 | 11/2018 | Chen et al. | |
| 10,235,474 B2 | 3/2019 | Haubenschild et al. | |
| 10,831,773 B2 | 11/2020 | Schoueri et al. | |
| 11,263,190 B2 | 3/2022 | Billa et al. | |
| 2016/0299991 A1* | 10/2016 | Hong | G06F 16/2246 |
| 2017/0068748 A1 | 3/2017 | Hu et al. | |
| 2022/0179730 A1* | 6/2022 | Chan | G06F 11/0787 |
| 2023/0121198 A1 | 4/2023 | Koupy et al. | |
| 2023/0418870 A1* | 12/2023 | Hauck | G06F 16/9024 |

FOREIGN PATENT DOCUMENTS

CN       113326125      3/2023

OTHER PUBLICATIONS

Qiyan Li et al., "Skyline Group Queries in Large Road-Social Networks Revisted", IEEE Transactions on Knowledge and Data Engineering, vol. 35, No. 3 Mar. 2023, 15 pages.
(Continued)

*Primary Examiner* — Charles Rones
*Assistant Examiner* — Xiaoqin Hu
(74) *Attorney, Agent, or Firm* — The Farrell Law Firm, P.C.

(57) ABSTRACT

Methods and memory devices are provided in which at least one parser of a memory device converts graph input data into an edge list and a vertex list for a graph database. A merge sorter of the memory device sorts the vertex list to generate a sequential list of vertices. The edge list is converted into a translated list of edges using identifiers (IDs) of the sequential list of vertices. The merge sorter sorts the translated list of edges to generate a sequential list of edges. The graph database is generated using the sequential list of edges.

11 Claims, 7 Drawing Sheets

(56) References Cited

OTHER PUBLICATIONS

European Search Report dated Jan. 3, 2024 Issued in counterpart application No. 23193909.1-1203, 10 pages.
D. Li, Y. Yang, W. Li and Q. Yang, "CISC: Coordinating Intelligent SSD and CPU to Speedup Graph Processing," 2018 17th International Symposium on Parallel and Distributed Computing (ISPDC), Geneva, Switzerland, 2018, pp. 149-156, doi: 10.1109/ISPDC2018.2018.00029, pp. 8.

* cited by examiner

METHODS AND SYSTEM FOR IMPORTING DATA TO A GRAPH DATABASE USING NEAR-STORAGE PROCESSING

PRIORITY

This application is based on and claims priority under 35 U.S.C. § 119 (e) to U.S. Provisional Patent Application Ser. No. 63/402,446, filed on Aug. 30, 2022, and U.S. Provisional Patent Application Ser. No. 63/445,687. filed on Feb. 14, 2023, the entire contents of which are incorporated herein by reference.

TECHNICAL AREA

The present disclosure relates generally to graph databases, and more particularly, to a method and system for importing data to a graph database using near-storage processing.

BACKGROUND

The present background section is intended to provide context only, and the disclosure of any concept in this section does not constitute an admission that said concept is prior art.

Sparse data arises in a wide variety of applications, and, when imported to a database, may result in the formation of data sets having empty or null values. Sparse data may present challenges in a relational database management system (RDBMS) because tables may occupy large amounts of storage dedicated to these null values.

As a result, graph databases or column-oriented databases have been used for sparse data. Many types of information may be naturally expressed as graphs, including casual relationships, social networks, and network architectures. Graph databases store data in the form of nodes connected with relationships. Nodes are the main entities in a graph and may also be referred to as vertices or points. Relationships are the connections between those entities, and may also be referred to as edges or links. Analyzing and mining such graphs has been effective in areas including computer security, bioinformatics, and understanding social networks.

With the growing interest in large-scale graph analytics for various applications, achieving high performance in importing data to graph databases has become increasingly crucial. However, handling and processing these graphs may be challenging due to their irregular nature and sparse representations using indirect data structures.

SUMMARY

According to an embodiment, a method is provided in which at least one parser of a memory device converts graph input data into an edge list and a vertex list for a graph database. A merge sorter of the memory device sorts the vertex list to generate a sequential list of vertices. The edge list is converted into a translated list of edges using identifiers (IDs) of the sequential list of vertices. The merge sorter sorts the translated list of edges to generate a sequential list of edges, and the graph database is generated using the sequential list of edges.

According to this embodiment, the graph input may include an event log for graph generation, and the at least one parser may include an array of object-notation parsers. The vertex list may include vertex universally unique identifiers (UUIDs). A balanced tree (B-tree) vertex map may be generated, from the sequential list of vertices, that maps the vertex UUIDs to integer IDs. Vertex UUIDs in the edge list may be converted to corresponding integer IDs using the B-tree vertex map. Activity of the at least one parser and the merge sorter is nonsynchronous in the memory device.

According to an embodiment, a memory device is provided including a storage medium and a controller. The controller is configured to convert graph input data into an edge list and a vertex list for a graph database, and sort the vertex list to generate a sequential list of vertices. The controller is also configured to convert the edge list into a translated list of edges using IDs of the sequential list of vertices, sort the translated list of edges to generate a sequential list of edges, and generate the graph database using the sequential list of edges.

Accordingly to this embodiment, the graph input data may include an event log for graph generation. The graph input data may be converted using an array of object-notation parsers. The vertex list may include vertex UUIDs. The controller may be further configured to generate, from the sequential list of vertices, a B-tree vertex map that maps the vertex UUIDs to integer IDs. Vertex UUIDs in the edge list may be converted to corresponding integer IDs using the B-tree vertex map.

According to an embodiment, a memory device is provided including a solid state drive and a field programmable gate array (FPGA) including at least one parser and a merge sorter. The FPGA is configured to convert graph input data into an edge list and a vertex list for a graph database using the at least one parser. The FPGA is also configured to sort the vertex list, using the merge sorter, to generate a sequential list of vertices, and convert the edge list into a translated list of edges using IDs of the sequential list of vertices. The FPGA is further configured to sort the translated list of edges, using the merge sorter, to generate a sequential list of edges, and generate the graph database using the sequential list of edges.

According to this embodiment, the graph input data may include an event log for graph generation. The graph input data may be converted using an array of object-notation parsers. The vertex list may include vertex UUIDs. The controller may be further configured to generate, from the sequential list of vertices, a B-tree vertex map that maps the vertex UUIDs to integer IDs. Vertex UUIDs in the edge list may be converted to corresponding integer IDs using the B-tree vertex map. Activity of the at least one parser and the merge sorter is nonsynchronous in the FPGA.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale. The above and other aspects, features, and advantages of certain embodiments of the present disclosure will be more apparent from the following detailed description, taken in conjunction with the accompanying drawings, in which.

DETAILED DESCRIPTION

Figure 1:
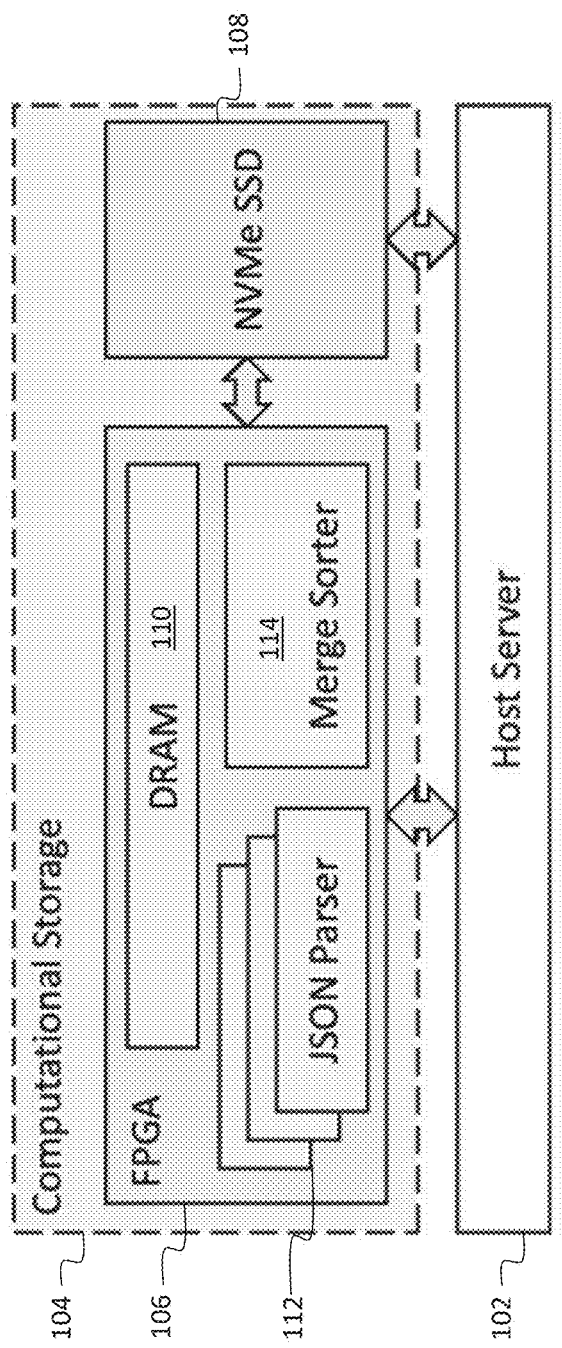
FIG. 1 is a diagram illustrating hardware architecture of a system for importing data to a graph database using one or more near-storage accelerator modules, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device, according to one embodiment, may be one of various types of electronic devices utilizing storage devices. The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), NVlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or FPGAs.

The importing of data to a graph database, which may also be referred to as data ingestion, may influence graph database performance. The parsing of text from input data may incur high performance overhead, and due to graph size and complex data structures, data ingestion may incur high resource requirements in processing and memory. Accordingly, the rate of data collection may be higher than the rate that the graph database can support, while also managing inherently complex data structures necessary to maintain the graph. Such challenges in data ingestion may increase expenses for streaming workloads.

Embodiments of the disclosure enable high performance for graph databases and analytics platforms on datasets. Specifically, a system is provided for importing bulk data to a graph database using near-storage accelerator modules. The system can include near-storage accelerator modules including, for example, a parser and a merge sorter (or sorting accelerator), which are described in greater detail below with respect to FIG. 1.

Implementation of this near-storage acceleration system may result in performance improvements when compared to a multi-threaded software implementation, and may demonstrate improvements over some column-oriented and graph databases. For example, host server utilization may be reduced without significantly impacting performance, and memory capacity limitations may be reduced, allowing for importing of data for larger graphs than some databases.

Near-storage acceleration may offer an attractive solution to big data challenges, and may provide an increase in effective bandwidth, high performance via application-specific hardware accelerators, and high-power efficiency. The system may be implemented using computational storage devices, such as, for example, those using solid-state drives (SSDs). General-purpose cores or FPGAs may be used in the system. However, the cores may be slow in comparison to the FPGAs, and the FPGAs may be difficult to program compared to the cores. Thus, a library or catalog of available accelerator modules may be utilized.

FIG. 1 is a diagram illustrating hardware architecture of a system for importing data to a graph database using near-storage accelerator modules, according to an embodiment. Embodiments are not limited to the specific arrangement illustrated in FIG. 1, and embodiments are equally applicable to the arrangement provided in FIG. 6. Functions of the data importing system include, but are not limited to, parsing raw input data, extracting connections between vertices based on the parsing, mapping the original (potentially randomly-assigned) vertex IDs to a new, contiguous vertex ID space, and encoding the extracted graph information in a structure, such as, for example, a compressed sparse row (CSR) format.

As shown in FIG. 1, a host server 102 can be in communication with computational storage 104. The computational storage 104 can include an FPGA 106 and an NVMe SSD 108. Embodiments are not limited the FPGA 106 and NVMe SSD 108 shown in FIG. 1, and other types of storage devices and associated chip types may be used in other embodiments.

The FPGA 106 includes a dynamic random access memory (DRAM) 110 and application-specific hardware accelerators. Two classes of hardware accelerators may include a parser 112 and a merge sorter 114. The parser 112 may generally assign meaning to portions of a sequence of data received en masse, which may also be referred to as string parsing. The parser 112 can include an object-notation parser, such as, for example, a JavaScript® object notation (JSON) parser, which assists in removing a string-parsing bottleneck in the system. The JSON parser may read and write entries using a JSON format, which is a lightweight data-interchange format. Two structures are used in such parsing, an ordered list of values (array) and collection of name/value pairs (object).

The parser 112 may include an array of parallel JSON parsers (e.g., 12 JSON parsers). The array of parsers may perform wire-speed parsing within available FPGA chip resources. Each parser may import data at one byte per cycle. This accelerator may maintain a shift buffer that may be compared against a user-programmable query string buffer at every cycle. The character query may represent the JSON field name of interest, and may be used to extract the source and destination indices for each edge. If there is a match, the matched offset may be sent to a field extractor module, which extracts the field content of interest.

Although this embodiment describes a JSON parser, other string-format information may also be parsed, such as, for example, comma separated values (CSV) files.

The merge sorter 112 may include a sorter tree that may sort to/from the DRAM 110 or storage. This accelerator may be invoked by a software manager in multiple phases of the data importing process. Merge sorting is a comparison-based sorting method in which an unsorted list is divided into sublists, each having a single element. The sublists are repeatedly merged to produce new sorted sublists until a single sublist remains, which is the sorted list. Accordingly, the merge sorter 112 may transform random insertions into a sequential stream for efficient storage updates, simplifying both index and graph data structure generation.

The merge sorter 112 may be implemented through a tree-based architecture of 2-to-1 merge sorters. As described above, beginning with sublists having a single element, the sublists are repeatedly merged at each 2-to-1 merge sorter to produce new sorted sublists until a single sorted list remains. For example, a 16-to-1 merge sorter uses a 4-deep tree architecture having eight 2-to-1 merge sorters in a first stage, which provide output to four 2-to-1 merge sorters in a second stage, which provide output to two 2-to-1 merge sorters in a third stage, which provide output to a single 2-to-1 merge sorter in a fourth stage, resulting in the fully sorted list.

While both accelerators are shown in FIG. 1, the system may be configured to operate in phases, as described with respect to FIG. 2 below, and each phase may be configured to use a single accelerator at a given time (e.g., nonsynchronous use). Due to the length of each phase for larger graphs, each accelerator may make use of the entire FPGA 106 without having to balance resources with another accelerator. The FPGA 106 may be reconfigured for each phase with the necessary accelerator without impacting performance.

When compared to a multi-thread processor running graph databases and columnar databases, the computational storage 104 may show an increase in power efficiency and a decrease in power consumption.

Figure 2:
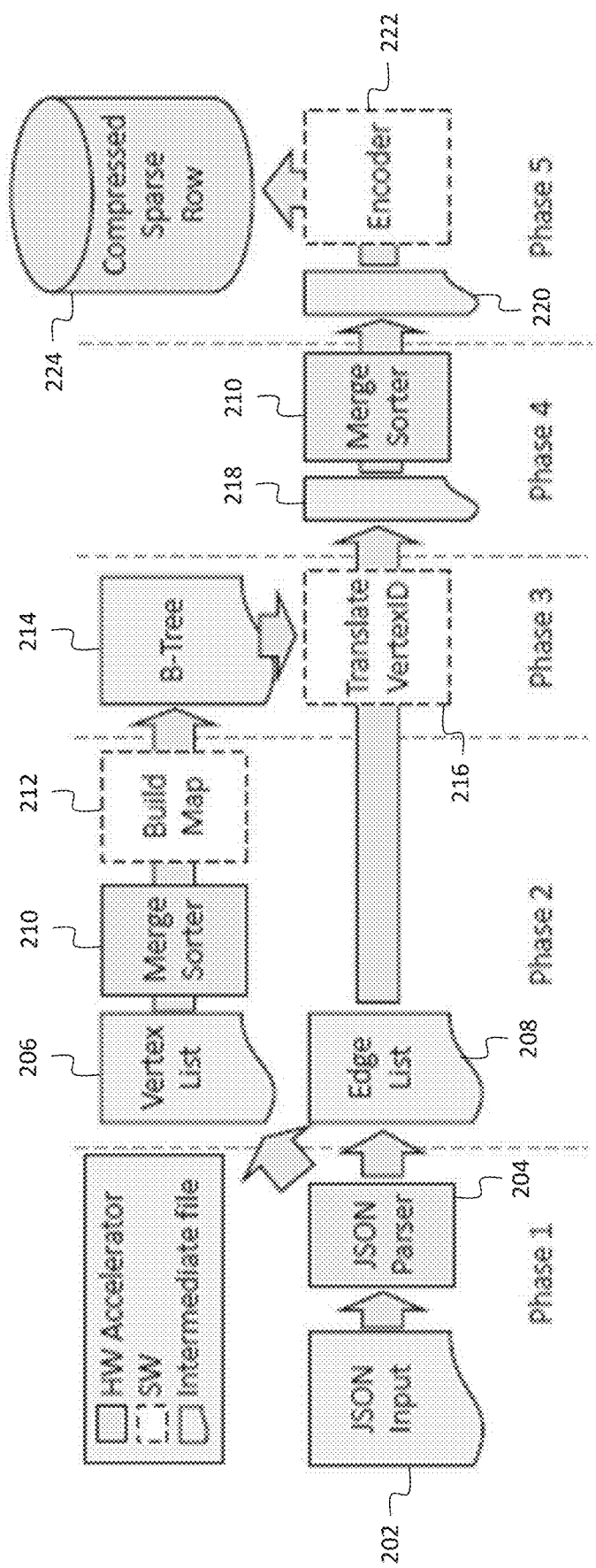
FIG. 2 is a diagram illustrating a process of importing data to a graph database using near-storage accelerator modules, according to an embodiment.

FIG. 2 is a diagram illustrating a process for importing data to a graph database using near-storage accelerator modules, according to an embodiment. The diagram illustrates a five phase structure in which each phase may be optimized separately, and the near-storage FPGA, as shown in FIG. 1, may be reconfigured with a different accelerator between phases. In this embodiment, all storage updates are sequential because insertions to a vertex map or a CSR data structure are fully sorted by the accelerator, as described in greater detail below.

In a first phase, input 202 may be provided to a parser 204. The parser 204 may include the array of parallel JSON parsers described above in FIG. 1. The input 202 may include an event log for graph database generation or construction. An event log may represent captured event data with every row representing a single event with event attributes.

In a second phase, a vertex list 206 and an edge list 208 are output in text format from the parser 204, based on the input. The vertex list 206 represents the vertices of the graph database and may contain original vertex UUIDs that may be randomly assigned, (not contiguous) and in a string format (not in an integer format). A UUID may be a 36-character alphanumeric string that can be used to uniquely identify information. The edge list 208 represents relationships between pairs of vertices.

When left unmodified, the vertex list 206 may result in importing and querying difficulties due to the random and non-sequential values therein. The vertex list 206 may be provided to a merge sorter 210, which sorts the vertex list 206. The merge sorter 210 may include the 16-to-1 merge sorter described above with respect to FIG. 1. The merge sorter 210 provides a sorted vertex list to map building software 212 for sequential vertex map construction, thereby assigning a new, contiguous integer ID to all new vertices. A least recently used (LRU) caching strategy may be effectively utilized in the system.

Figure 3:
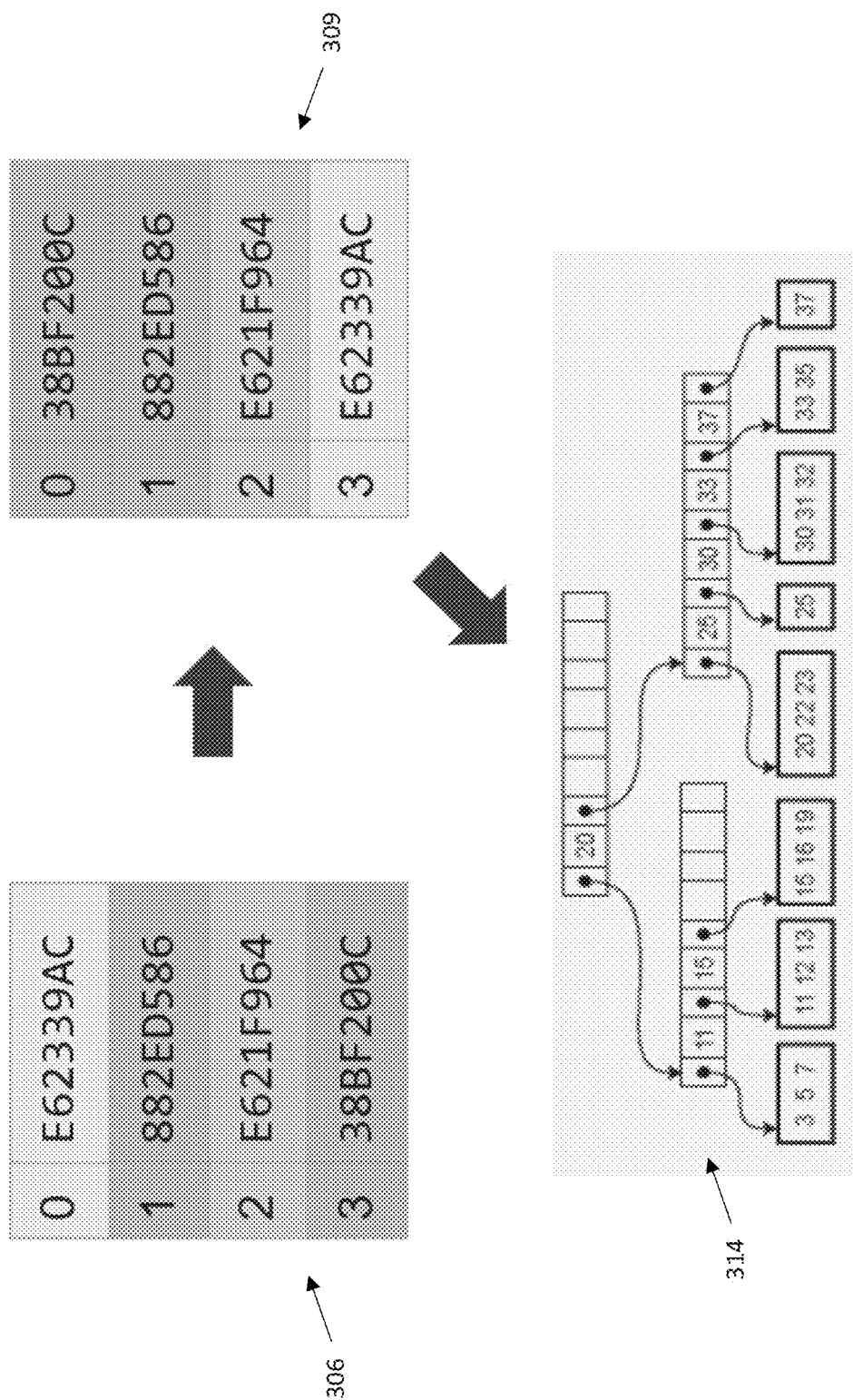
FIG. 3 is a diagram illustrating a vertex map generation step in the process of importing data to a graph database, according to an embodiment.

FIG. 3 is a diagram illustrating a vertex map generation step in the process of importing data to a graph database, according to an embodiment. A first vertex list 306 may be sorted, resulting in a second vertex list 309. The first vertex list 306 may be embodied as the vertex list 206 in FIG. 2, and contains original vertex UUIDs. The second vertex list 309 may be used to sequentially construct a vertex map 314 that maps original vertex UUIDs to new contiguous integer IDs. Vertex ID mapping may result in a map that exceeds DRAM bandwidth of the computing system. Further, random updates and reads can impact the input data and can reduce performance with storage devices. To address this, the vertex map 314 may include B-tree vertex map. Because the first vertex list 306 may be sorted by original vertex IDs using the merge sorter 210, B-tree insertion may be completely sequential. The resulting B-tree vertex map is a self-balancing tree data structure having nodes sorted in the inorder traversal. Each node in a B-tree may contain multiple keys, allowing the tree to have a larger branching factor and shallower height, which is beneficial in search and insertion operations. Balance may be maintained by ensuring that each node has a minimum number of keys.

Referring back to FIG. 2, in a third phase, a resulting B-tree vertex map 214 from the vertex map construction may be provided to vertex ID translation software 216 along with the edge list 208 for edge list translation. Specifically, source and destination vertex IDs in the edge list 208 are translated from the original vertex UUIDs to the new integer IDs, via the B-tree vertex map 214. This may involve some random access into storage, which can be reduced by a configurably-sized host side cache.

Figure 4:
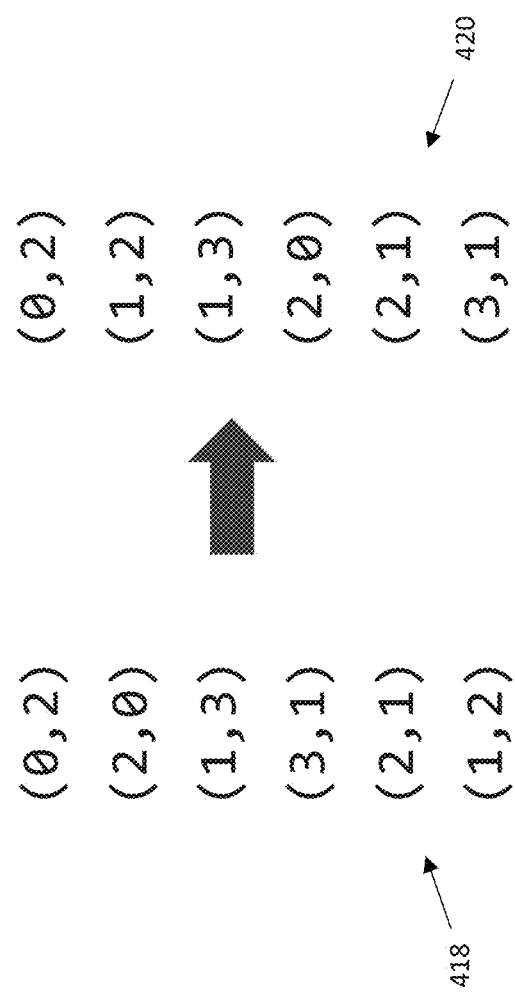
FIG. 4 is a diagram illustrating an edge list sorting step in the process of importing data to a graph database, according to an embodiment.

In a fourth phase, a translated edge list 218 may have random vertex ID ordering, and may be provided to the merge sorter 210 for edge list sorting. FIG. 4 is a diagram illustrating an edge list sorting step in the process of importing data to a graph database, according to an embodiment. Specifically, a translated, but random-ordered, edge list 418 may be sorted, resulting a sorted edge list 420.

Referring back to FIG. 2, in a fifth phase, a sorted edge list 220 may be provided to an encoder 222 for sequential construction of a graph represented in a CSR format 224. The graph represented in the CSR format 224 may be used for various graph-based applications.

Figure 5:
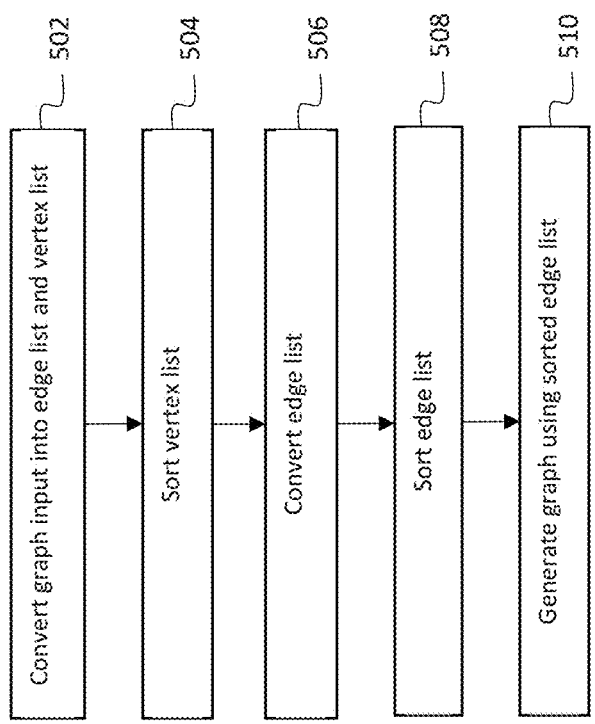
FIG. 5 is a diagram illustrating a method for importing data to a graph database using near-storage accelerator modules, according to an embodiment.

FIG. 5 is a diagram illustrating a method for importing data to graph database using near-storage accelerator modules, according to an embodiment. At 502, at least one parser of a memory device coverts graph input data into an edge list and a vertex list for a graph database. The graph input data may include an event log for graph generation. The vertex list may be vertex UUIDs. The at least one parser may be an array of object-notation parsers.

At 504, a merge sorter of the storage device sorts the vertex list to generate a sequential list of vertices. The merge sorter may include a 16-to-1 merge sorter that sorts to/from a memory of the memory device. A B-tree vertex map may be generated from the sequential list of vertices and maps the vertex UUIDs to integer IDs.

At 506, the edge list may be converted into a translated list of edges using IDs of the sequential list of vertices. Vertex UUIDs in the edge list may be converted to corresponding integer IDs using the B-tree vertex map. At 508, the merge sorter sequentially sorts the translated list of edges to generate a sequential list of edges.

At 510, the graph database may be generated using the sequential list of edges.

Figure 6:
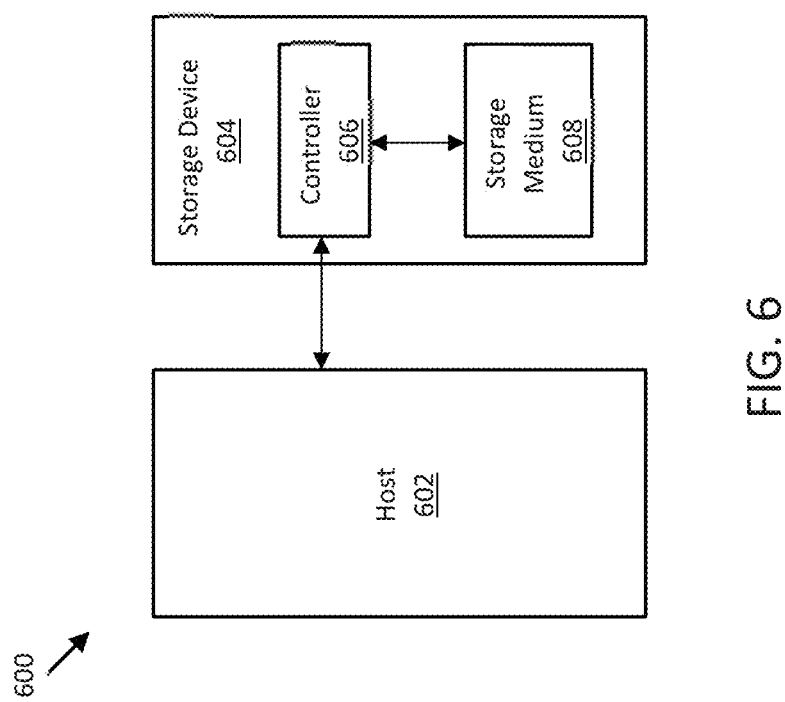
FIG. 6 is a diagram illustrating a storage system for importing data to a graph database, according to an embodiment.

FIG. 6 illustrates a diagram of a storage system 600 for importing data to a graph database, according to an embodiment. The storage system 600 provides a more general description of the hardware architecture of FIG. 1. The storage system 600 includes a host 602 and a storage device 604. Although one host and one storage device is depicted, the storage system 600 may include multiple hosts and/or multiple storage devices. The storage device 604 may be an SSD, a universal flash storage (UFS), etc. The storage device 604 includes a controller 606 and a storage medium 608 connected to the controller 606. The controller 606 may be an SSD controller, a UFS controller, etc. The storage medium 608 may include a volatile memory, a non-volatile memory, or both, and may include one or more flash memory chips (or other storage media). The controller 606 may include one or more processors, one or more error correction circuits, one or more FPGAs, one or more host interfaces, one or more flash bus interfaces, etc., or a combination thereof. The controller 606 may be configured to facilitate transfer of data/commands between the host 602 and the storage medium 608. The host 602 sends data/ commands to the storage device 604 to be received by the controller 606 and processed in conjunction with the storage medium 608.

As described herein, the methods, processes and algorithms may be implemented on a storage device controller, such as controller 606. An embodiment of the storage system 600 is shown in the hardware architecture of FIG. 1, where the storage device 604 may include the computational storage 104, the controller 606 may include the FPGA 106, and the storage medium 608 may include the NVMe SSD 108.

Figure 7:
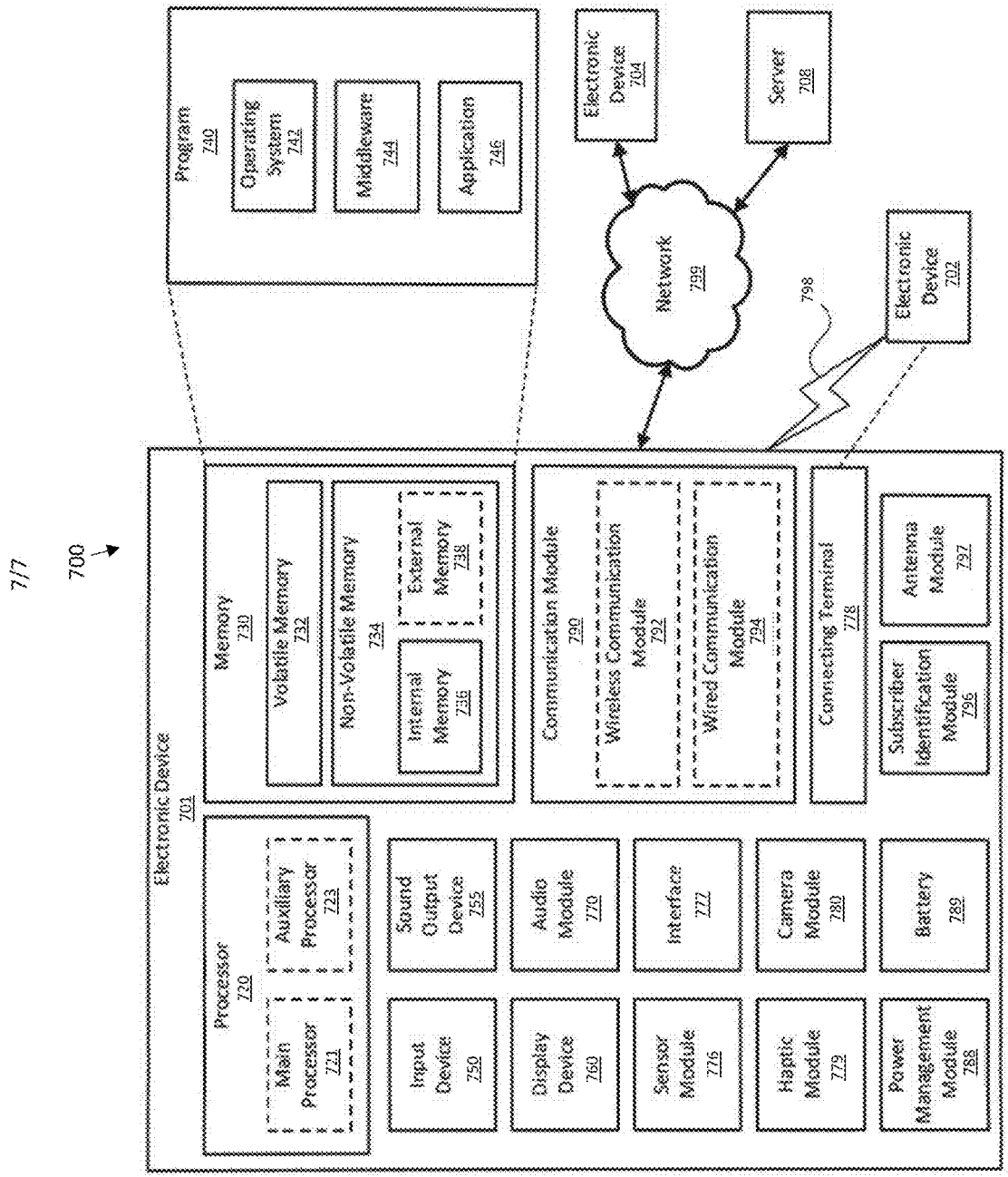
FIG. 7 is a block diagram of an electronic device in a network environment for importing data to a graph database, according to an embodiment.

FIG. 7 is a block diagram of an electronic device in a network environment 700 for importing data to a graph database, according to an embodiment. This electronic device may be one of various types of electronic devices that utilizes storage devices described above in FIGS. 1 and 6.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from a host or another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734. Non-volatile memory 734 may include internal memory 736 and/or external memory 738. The memory 730 may be embodied as the computational storage 104 of FIG. 4 or the storage device 604 of FIG. 6.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as BLUETOOTH™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
converting, by at least one parser of a memory device, graph input data into an edge list and a vertex list for a graph database, wherein the vertex list comprises vertex universally unique identifiers (UUIDs) in a string format, and wherein the edge list comprises pairs of vertex UUIDs from the vertex list;
sorting, by a merge sorter of the memory device, the vertex UUIDs into a sequential order to generate a sequential list of vertices;
generating a B-tree vertex map by inserting the vertex UUIDs from the sequential list of vertices into the B-tree vertex map, the B-tree vertex map being configured to assign contiguous integer identifiers (IDs) to the vertex UUIDs based on the order of the vertex UUIDs in the sequential list of vertices;
converting the pairs of vertex UUIDs in the edge list into pairs of integer IDs in a translated list of edges using the sequential list of vertices;
sorting, by the merge sorter, the pairs of integer IDs in the translated list of edges into a sequential order to generate a sequential list of edges; and
generating the graph database using the sequential list of edges.

2. The method of claim 1, wherein the graph input data comprises an event log for graph generation.

3. The method of claim 1, wherein the at least one parser comprises an array of object-notation parsers.

4. The method of claim 1, wherein activity of the at least one parser and the merge sorter is nonsynchronous in the memory device.

5. A memory device, comprising:
a controller; and
a non-transitory computer readable storage medium storing instructions that, when executed, cause the controller to:
convert graph input data into an edge list and a vertex list for a graph database, wherein the vertex list comprises vertex universally unique identifiers (UUIDs) in a string format, and wherein the edge list comprises pairs of vertex UUIDs from the vertex list;
sort the vertex UUIDs into a sequential order to generate a sequential list of vertices;
generate a B-tree vertex map by inserting the vertex UUIDs from the sequential list of vertices into the B-tree vertex map, the B-tree vertex map being configured to assign contiguous integer identifiers (IDs) to the vertex UUIDs based on the order of the vertex UUIDs in the sequential list of vertices;
convert the pairs of vertex UUIDs in the edge list into pairs of integer IDs in a translated list of edges using the sequential list of vertices;
sort the pairs of integer IDs in the translated list of edges into a sequential order to generate a sequential list of edges; and
generate the graph database using the sequential list of edges.

6. The memory device of claim 5, wherein the graph input data comprises an event log for graph generation.

7. The memory device of claim 5, wherein the graph input data is converted using an array of object-notation parsers.

8. A memory device, comprising:
a solid state drive; and
a field programmable gate array (FPGA) comprising at least one parser and a merge sorter, wherein the FPGA is configured to:
convert graph input data into an edge list and a vertex list for a graph database, using the at least one parser, wherein the vertex list comprises vertex universally unique identifiers (UUIDs) in a string format, and wherein the edge list comprises pairs of vertex UUIDs from the vertex list;
sort the vertex UUIDs into a sequential order, using the merge sorter, to generate a sequential list of vertices;
generate a B-tree vertex map by inserting the vertex UUIDs from the sequential list of vertices into the B-tree vertex map, the B-tree vertex map being configured to assign contiguous integer identifiers (IDs) to the vertex UUIDs based on the order of the vertex UUIDs in the sequential list of vertices;
convert the pairs of vertex UUIDs in the edge list into pairs of integer Ds in a translated list of edges using the sequential list of vertices;
sort the pairs of integer IDs in the translated list of edges into a sequential order, using the merge sorter, to generate a sequential list of edges; and
generate the graph database using the sequential list of edges.

9. The memory device of claim 8, wherein the graph input data comprises an event log for graph generation.

10. The memory device of claim 8, wherein the graph input data is converted using an array of object-notation parsers.

11. The memory device of claim 8, wherein activity of the at least one parser and the merge sorter is nonsynchronous in the FPGA.

* * * * *